(12) United States Patent
Morgan

(10) Patent No.: US 11,760,054 B2
(45) Date of Patent: Sep. 19, 2023

(54) KNITTED COMPONENT WITH THERMAL PROPERTIES

(71) Applicant: NIKE, Inc., Beaverton, OR (US)

(72) Inventor: Daniel Morgan, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 204 days.

(21) Appl. No.: 16/397,699

(22) Filed: Apr. 29, 2019

(65) Prior Publication Data

US 2019/0344529 A1 Nov. 14, 2019

Related U.S. Application Data

(60) Provisional application No. 62/669,244, filed on May 9, 2018.

(51) Int. Cl.
| | | |
|---|---|---|
| *B32B 5/26* | (2006.01) | |
| *B32B 5/02* | (2006.01) | |
| *B32B 5/12* | (2006.01) | |

(52) U.S. Cl.
CPC ............ *B32B 5/026* (2013.01); *B32B 5/12* (2013.01); *B32B 2307/30* (2013.01); *B32B 2437/00* (2013.01)

(58) Field of Classification Search
CPC ....... B32B 5/026; B32B 5/12; B32B 2307/30; B32B 2437/00
USPC ..................................................... 66/169 R
See application file for complete search history.

(56) References Cited

U.S. PATENT DOCUMENTS

| | | |
|---|---|---|
| 2,073,402 A | 2/1936 | Fleisher |
| 2,108,925 A | 2/1936 | Raynor |
| 2,111,353 A * | 3/1938 | Berry .................. D04B 1/28 66/174 |
| 2,191,883 A | 4/1938 | Fleisher |
| 2,584,834 A * | 2/1952 | Frank .................. A41B 3/00 66/176 |
| 2,839,909 A | 5/1957 | Morgan |
| 2,872,800 A | 2/1958 | Davis, Jr. et al. |
| 3,785,173 A * | 1/1974 | Hanney ............... D04B 9/56 66/172 R |
| 4,109,492 A * | 8/1978 | Roberts ............... D04B 1/106 66/172 E |
| 4,236,257 A | 12/1980 | Williams et al. |
| 4,237,707 A | 12/1980 | Safrit et al. |
| 4,838,045 A | 6/1989 | Cournoyer et al. |

(Continued)

FOREIGN PATENT DOCUMENTS

| | | |
|---|---|---|
| CN | 1219926 C | 9/2005 |
| CN | 101669681 A | 3/2010 |

(Continued)

OTHER PUBLICATIONS

Translation of EP 1,241,286 A1 (Year: 2002).*

(Continued)

*Primary Examiner* — Danny Worrell
*Assistant Examiner* — Dakota Marin
(74) *Attorney, Agent, or Firm* — SHOOK, HARDY AND BACON LLP

(57) ABSTRACT

The subject matter of this disclosure includes knit textiles, such as knitted components, that have one or more amounts of thermal resistance. In addition, this disclosure describes a knit textile panel having varied amounts of thermal properties among different zones or regions of the knit textile panel.

19 Claims, 7 Drawing Sheets

(56) References Cited

U.S. PATENT DOCUMENTS

| | | | |
|---|---|---|---|
| 4,888,964 A | | 12/1989 | Klinge |
| 5,031,425 A | | 7/1991 | Cournoyer et al. |
| 5,255,538 A | | 10/1993 | Day et al. |
| 5,263,342 A | | 11/1993 | Mundstock |
| 5,561,861 A | | 10/1996 | Lopez et al. |
| 5,636,533 A | | 6/1997 | Hunneke et al. |
| 6,158,253 A | * | 12/2000 | Svoboda ............... A41B 11/0042/239 |
| 6,622,528 B2 | | 9/2003 | Masse et al. |
| 7,096,693 B2 | | 8/2006 | Yui |
| 7,587,915 B2 | | 9/2009 | Kaneda |
| 9,803,300 B2 | | 10/2017 | Gaither |
| 2013/0196109 A1 | * | 8/2013 | Rock ..................... B32B 5/02 428/76 |
| 2015/0289579 A1 | * | 10/2015 | Meir .................... A43B 23/027 36/9 R |
| 2016/0186366 A1 | * | 6/2016 | McMaster ................ D04B 1/14 66/202 |
| 2021/0062379 A1 | * | 3/2021 | Diaz ...................... D04H 3/005 |

FOREIGN PATENT DOCUMENTS

| | | | | |
|---|---|---|---|---|
| CN | 103564666 A | | 2/2014 | |
| EP | 1241286 A1 | * | 9/2002 | ............. D04B 1/102 |
| EP | 1241286 B1 | | 2/2003 | |
| JP | 200133600 | | 12/2001 | |
| JP | 3415617 B1 | | 6/2003 | |
| JP | 2004100054 A | * | 4/2004 | |
| KR | 100771556 B1 | | 10/2007 | |
| WO | 02087367 A1 | | 11/2002 | |
| WO | 2016116230 A1 | | 7/2016 | |

OTHER PUBLICATIONS

JP-2004100054-A English Translation (Year: 2002).*

El-Hady, "Effect of Stitch Type on Air Permeability of Summer Outerwear Knitted Fabrics", International Journal of Advance Research in Science and Engineering, vol. No. 5, Issue No. 3, Mar. 2016; http://www.ijarse.com/images/fullpdf/1457010153_1_Research_Paper.pdf, 7 pages.

Singh, "Investigation on the effect of knit stitch on the performance of weft knitted fabric", http://scientificresearchjournal.com/wp-content/uploads/2017/05/Home-Science-Vol-4_A-272-282-Full-Paper.pdf, 11 pages.

International Preliminary Report on Patentability received for PCT Patent Application No. PCT/US2019/030133, dated Nov. 19, 2020, 8 pages.

International Search Report and Written Opinion dated Aug. 13, 2019 in International Patent Application No. PCT/US2019/030133, 17 pages.

Office action received for European Patent Application No. 19723981.7, dated Sep. 26, 2022, 6 pages.

* cited by examiner

KNITTED COMPONENT WITH THERMAL PROPERTIES

CROSS-REFERENCE TO RELATED APPLICATIONS

This U.S. application Ser. No. 16/397,699, entitled "Knitted Component with Thermal Properties," and filed on Apr. 29, 2019, claims the benefit of priority of U.S. Prov. App. No. 62/669,244, entitled "Knit Textile with Thermal Properties," and filed May 9, 2018. The entirety of the aforementioned application is incorporated by reference herein.

TECHNICAL FIELD

This disclosure relates to a textile having thermal properties.

BACKGROUND

Thermal properties (e.g., thermal resistance) are sometimes desired in a textile that is incorporated into a garment, and often, heavier textiles are utilized to provide certain thermal properties. However, a heavier textile may be disadvantageous in some respects. Furthermore, some articles (e.g., garments) include textile panels that are connected to one another (e.g., cut and sew), and each textile panel may be independently fabricated in a manner providing relatively limited variability of thermal properties. In these instances, limited variability of a panel's thermal properties may be disadvantageous.

BRIEF DESCRIPTION OF THE DRAWINGS

This subject matter is described in detail herein with reference to the figures submitted together with this disclosure. The figures are incorporated herein by reference.

DETAILED DESCRIPTION

The subject matter of the present invention is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed unless and except when the order of individual steps is explicitly stated.

Figure 1:
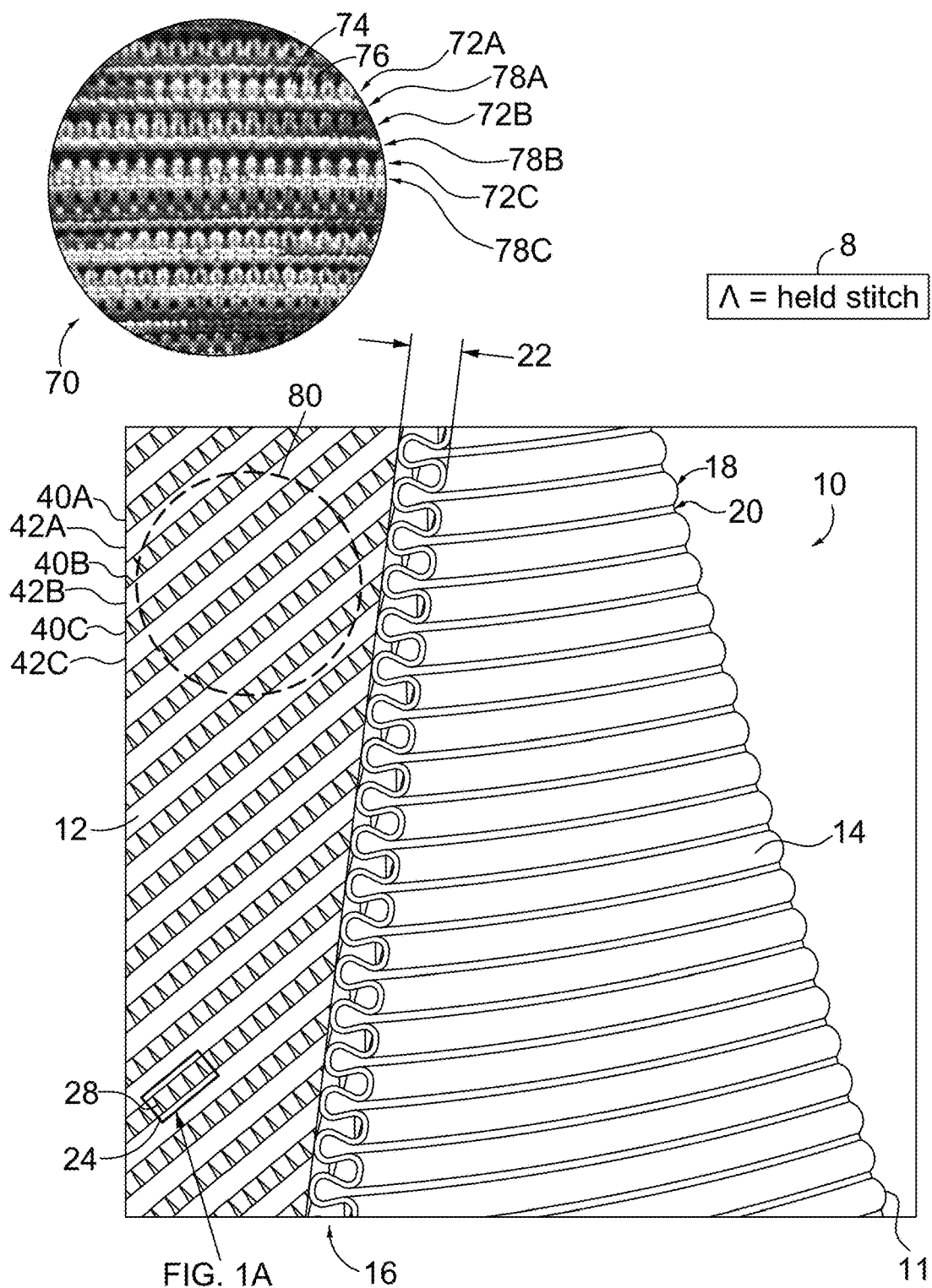
FIG. 1 depicts a knit front side and a knit back side of a textile having thermal properties in accordance with an aspect hereof.

At a high level, this disclosure describes knit textiles that have one or more amounts of thermal resistance and that are lighter weight than some other textiles that provide similar amounts of thermal resistance. In addition, this disclosure describes one or more knit textile panels having varied amounts of thermal properties among different zones or regions of the knit textile panel, the zones or regions being integrally knit with one another. Some of these aspects are generally depicted in FIG. 1, which illustrates an example knit textile 10 (also referred to herein as "knitted component 10"). The knit textile 10 is folded over itself along the horizon line 11, such that both a knit front side 12 and a knit back side 14 are depicted in FIG. 1. Furthermore, FIG. 1 depicts an edge 16 of the knit textile 10.

In FIG. 1, the knit stitches constructing the knit textile 10 combine to form corrugated structures that include ridges 18 and grooves 20 on the knit back side 14 (i.e., where each corrugated structure includes one ridge 18 and one groove 20). A size of the ridges 18 contributes to a textile thickness 22 measured from an exterior surface of the knit front side 12 to an exterior surface of the knit back side 14 at a peak of the ridge 18. The corrugated structures formed by the ridges 18 and grooves 20 contribute to thermal properties of the textile. As will be described in more detail in other parts of this disclosure, by varying the knit structure of the knit textile 10 across different zones, the size and/or shape of the ridges 18 can be varied, which in turn may contribute to varied thermal properties among the zones.

Figure 1A:
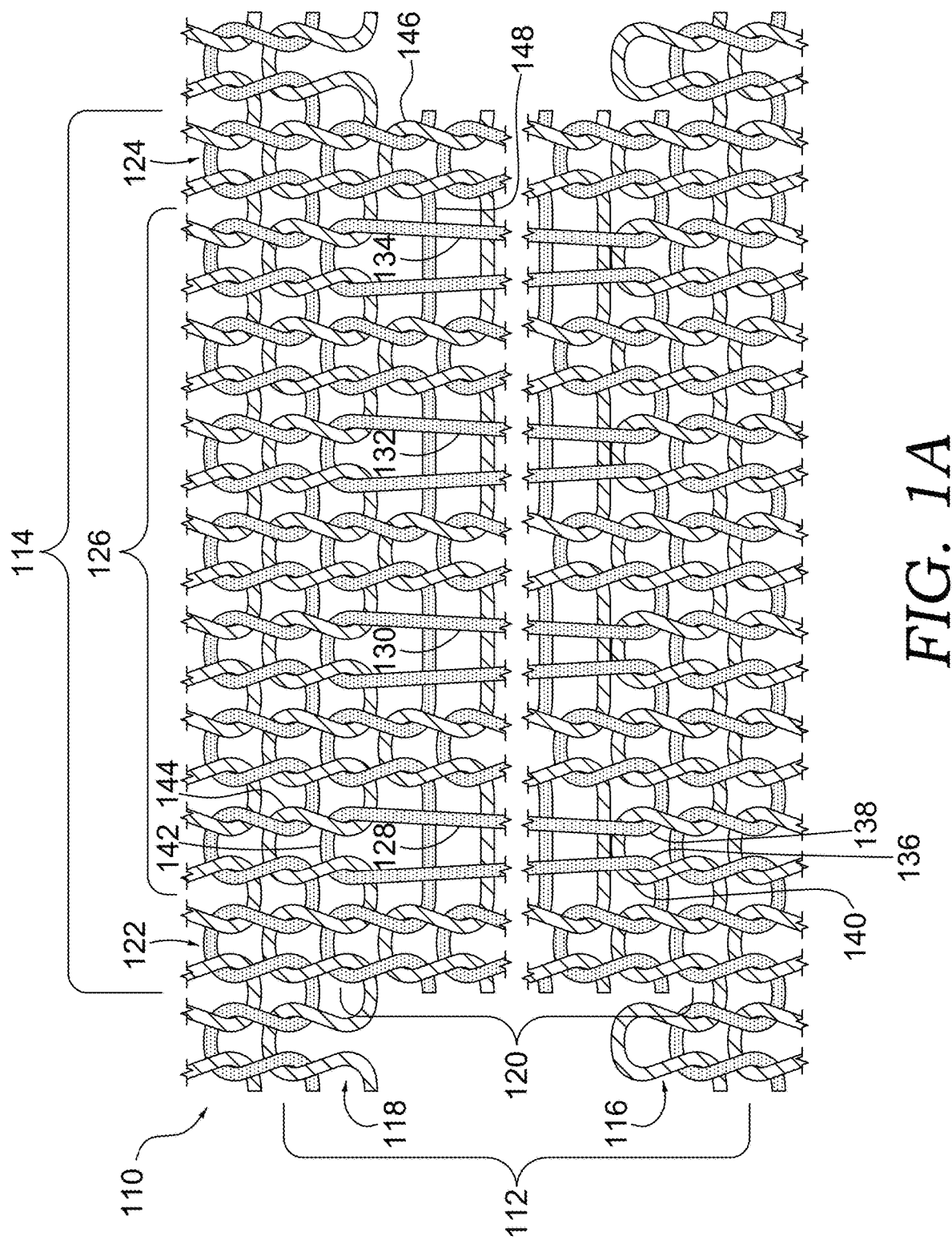
FIG. 1A depicts a schematic of an example knit diagram of a knit structure incorporated into the textile of FIG. 1 in accordance with an aspect hereof.

Turning now to FIG. 1A, a schematic illustration of a portion 24 of the knit front side 12 of the knit textile 10 of FIG. 1 is depicted. As such, FIG. 1A depicts a knit front side of a knit structure 110, and a combination of the various knit stitch types shown in FIG. 1A form the ridges 18 depicted in FIG. 1. One type of knit stitch included in FIG. 1A is a held stitch 128, which corresponds with the held-stitch representation 28 in FIG. 1. Furthermore, the legend 8 in FIG. 1 indicates that the "A" represents a held stitch. As used in this disclosure, a "held stitch" includes a stitch having stitch legs (or a stitch base) that interloop in a first course and stitch head that interloops in a second course, wherein one or more intermediary knit courses are arranged between the first course and the second course. As a result, the limbs of a held stitch are often elongated since the head of the held loop is not interlooped or intermeshed with the course that is successively arranged after the first course. Based on this definition of held stitch, a held stitch is generally created by, holding the stitch loop in the needle for the one or more intermediary courses in a manner that avoids interlooping with the intermediary courses, before eventually interlooping with a stitch in the second course.

Continuing with FIG. 1A, the knit structure 110 includes a set of consecutively arranged knit courses 112 and a set of consecutively arranged wales 114 with knit stitches forming a single jersey knit structure. As used in this disclosure, a "course" includes a horizontal row of knitted loops produced by adjacent needles, and a "wale" is a predominantly vertical column of intermeshed or interlooped knitted loops, generally produced by the same needle at successive (but not necessarily all) courses or knitting cycles. "Horizontal" and "vertical" are relative to an upright fabric as knitted in which the heads of the knitted loops face towards the top of the fabric and the course knitted first is oriented at the bottom of the fabric. A "single jersey knit structure" is defined herein as a knit structure (e.g., a weft knit structure) formed on a single set of needles, such as a single linear needle bed of a flat knitting machine or a single circular needle bed of a circular knitting machine. A "single jersey knit structure" is distinct from a "double jersey knit structure," which is a knit structure formed on multiple needle beds. For example, a knitted component incorporating a double jersey knit structure may be formed simultaneously on needles from front and back needle beds of a flat knitting machine having a V-bed configuration. All embodiments depicted in FIGS. 1-5 are fully formed with a single jersey knit structure. Other embodiments may include corrugated knit structures that are formed with other knit structures, such as a double jersey knit structure or a combination of a double jersey knit structure and a single jersey knit structure.

The set of consecutively arranged knit courses 112 includes a first knit course 116, a second knit course 118, and a set of intermediary knit courses 120 positioned between the first knit course 116 and the second knit course 118. The yarn strands of the courses are alternatingly depicted with cross-hatch and stipple in order to more easily distinguish the stitch structure in the schematic diagram, and the different depictions do not necessarily convey that the yarn strands have different properties. However in some aspects, the yarn strands may have different properties.

In addition, yarn strands forming the set of intermediary knit courses 120 are depicted with break lines to convey that the set of intermediary knit courses 120 may include additional knit courses arranged between the first knit course 116 and the second knit course 118. In FIG. 1A, the set of intermediary knit courses 120 is depicted as including five courses, and in other aspects, the set of intermediary courses 120 may include as few as two courses (i.e., the initial courses of the held stitch and the course over which the held stitch is held) or may include as many courses as a needle will tolerate before the tension of the held stitch is too high. The set of consecutively arranged wales includes a first wale 122, a second wale 124, and a set of intermediary wales 126 positioned between the first wale 122 and the second wale 124.

In FIG. 1A, the knit structure 110 also includes a set of held stitches 128, 130, 132, and 134 located between the first wale 122 and the second wale 124. Each held stitch includes stitch legs interlooped with a stitch in the first knit course 116 and a stitch head interlooped with a knit stitch in the second knit course 118. For example, the held stitch 128 includes stitch legs 136 and 138 that are interlooped with a stitch 140 positioned in the first knit course 116. In addition, the held stitch 128 includes a stitch head 142 interlooped with a knit stitch 144 positioned in the second knit course 118. The position of the stitch legs and the stitch head of the held stitches, as well as the number of intermediary courses are helpful to characterize the length of the held stitch (i.e., for how many courses the stitch is held in the needle before forming a knit stitch). In addition, the number of courses included in the set of intermediary knit courses 120 is one course greater than the number of courses over which a held stitch is held in the needle. For example, in a textile having a stitch held for a single course, the set of intermediary courses would include two courses (i.e., the initial course of the held stitch and the course over which the held stitch is held). In FIG. 1A each of the held stitches 128, 130, 132, and 134 is consistently positioned at every other wale, with a single knit stitch generally separating consecutive held stitches.

The set of intermediary knit courses 120 includes additional knit stitches (e.g., knit stitch 146) and floats (e.g., 148). Float stitches are generally created in the presence of a held stitch and in one or more courses that are successive to a first course in which a held-stitch base or legs are initially interlooped. In addition, the float stitch is generally in the same wale as the held stitch. In general, the float stitch includes a yarn segment that extends from a knitted loop in a wale on one side of the held stitch to another knitted loop in another wale on the other side of the held stitch. The yarn segment of the float stitch generally traverses across the wale in which the held loop is positioned A float stitch is generally formed when a needle holding the held loop fails to receive the new yarn segment. In contrast, when the needle holding the held loop receives the new yarn segment and combines the new yarn segment with the held loop, then a tuck stitch is typically formed, and the set of intermediary knit courses 120 could also include tuck stitches (not depicted).

As previously indicated, some of these stitches are depicted with break lines to convey that the set of intermediary knit courses 120 may include additional knit courses having additional knit stitches. In an aspect of the disclosure, when the knit structure 110 depicted in FIG. 1A is integrated into the knit textile 10 in FIG. 1, the tension of the held stitches 128, 130, 132, and 134 pulls the first knit course 116 towards the second knit course 118, which causes the knit stitches (not the held stitches) of the set of intermediary knit courses 120 to push or extend outward in the direction of the knit back side 14 and form the ridge 18 in FIG. 1. In this respect, the set of consecutively arranged knit courses 112 may also be referred to as a "ridge-forming band of courses." It is contemplated herein that to reduce snagging of the knit textile 10, the loop length of the held stitches 128, 130, 132, and 134 may be shortened by adjusting the extended position of the needles of the knitting machine used to form the knit textile 10, for example, by shortening the needles, adjusting the size of a cam that actuates the needle, etc.

Although the knit structure 110 depicted in FIG. 1A only represents a portion 24 of the knit textile 10, the knit structure 110 may be repeated throughout at least portions of the knit textile 10 to form the ridges. As such, FIG. 1 depicts alternating bands of stitch structures on the knit front side 12 of the knit textile 10. A first set of bands 40A, 40B, and 40C represents a repeating pattern of the knit structure 110, in which held stitches ("A") are regularly positioned in every other wale, such that consecutively held stitches are spaced apart by a single knit stitch. The bands 40A, 40B, and 40C each represent a ridge-forming band of courses. A second set of bands 42A, 42B, and 42C represents courses (e.g., 1 to 15 consecutively interlooped courses) that include knit stitches forming the grooves 20 of the knit textile 10, and those bands of one or more courses may be referred to as a "groove-forming band of courses." In one aspect, the groove-forming band of courses connect the last knit course of one ridge-forming band of courses with a first knit course of another ridge-forming band of courses. For example, the courses in band 42A are arranged between the last knit course (e.g., 118 in FIG. 1A) in band 40B and the first knit course (e.g., 116) in band 40A.

FIG. 1 also includes a magnified photographic view 70 of a region 80, and in an aspect of the present disclosure, the magnified photographic view 70 represents a front side of a knit textile formed by the structures represented by FIGS. 1 and 1A. In the magnified photographic view 70, the bands 72A, 72B, and 72C depict a repeating pattern of the knit structure 110, in which held stitches 74 and 76 are regularly positioned in every other wale and consecutively held stitches are spaced apart by a single knit stitch. As a result of the tension from the held stitches in the bands 72A, 72B, and 72C the textile extends towards the back side and forms the ridges 18 on the knit back side 14. Furthermore, the bands 78A, 78B, and 78C include groove-forming bands of courses that do not include held stitches and that form the grooves 20 on the knit back side 14.

As previously described, the ridges 18 contribute to amounts of thermal resistance of the knit textile 10, and by varying the size and shape of ridges positioned in different zones of a textile panel, thermal-resistance properties can be varied. In an aspect of the present disclosure, a knit textile includes variations of the knit structure depicted in FIG. 1A, and the variations contribute to varied thermal-resistance properties across the knit textile.

Figure 2:
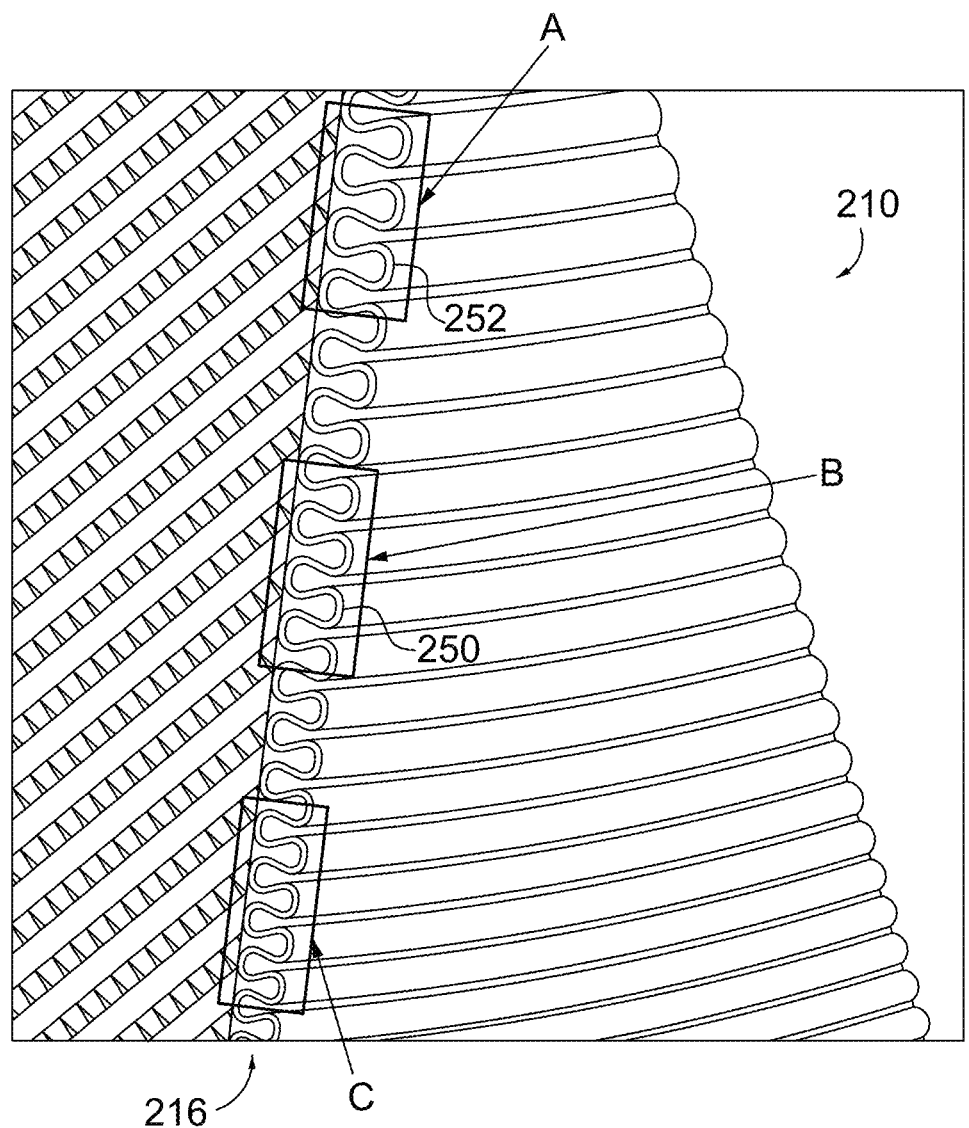
FIG. 2 depicts a knit front side and knit back side of another textile having thermal properties in accordance with an aspect hereof.

Reference is now made to FIG. 2, which illustrates an example manner in which variations in knit structure may contribute to variability across a textile panel. FIG. 2 depicts a knit textile 210 that is similar in some respects to the knit textile 10 of FIG. 1. For example, the knit textile 210 may include the knit structure 110 of FIG. 1A at least partially throughout, creating a set of ridges and grooves on the knit back side. However, the knit textile 210 includes zone "A", zone "B", and zone "C" that are identified along an edge 216 of the knit textile 210 and each of which includes a respective variation of the knit structure 110.

In one aspect of the disclosure, a variation of the knit structure 110 (FIG. 1A) in zone A includes a higher quantity of courses included in the set of intermediary knit courses 120, and a variation of the knit structure 110 in zone B includes a lower quantity of courses included in the set of intermediary knit courses 120. That is, the held stitches of zone A are held for a higher number of courses than the held stitches of zone B. The lower quantity of stitches in the set of intermediary knit courses included in zone B provides less fabric 250 to extend outward in the direction of the knit back side resulting in smaller ridges, as compared with fabric 252 in zone A forming a larger ridge. Moreover, a variation of the knit structure 110 in zone C includes a lowest quantity of courses included in the set of intermediary knit courses 120 (relative to zone A and zone B), and zone C is illustrated as including the smallest ridges.

The quantity of courses programmed for the set of intermediary knit courses 120 may be selected based on a variety of one or more factors. For example, the quantity may be selected based on a thermal property associated with the quantity, a fabric weight, and a zone of a garment at which the set of intermediary knit courses 120 is positioned. In one aspect of this disclosure, a quantity of courses included in the set of intermediary knit courses 120 is in a range of about 5 courses to about 27 courses. In some instances, a set of intermediary knit courses 120 below 5 courses does not result in a ridge yielding a sufficient thickness, and a set of intermediary knit courses 120 above 27 may create prohibitively high amounts of tension on a knitting needle. In a further aspect, the quantity of courses is in a range of about 7 to about 20. And in a further aspect, the quantity of courses is in a range of about 10 to about 18. However, these ranges are merely examples of some aspects of this disclosure, and in other aspects, the range may include a different set of values between 5 and 27, greater than 5 and 27, or less than 5 and 27. As used herein, the term "about" means within ±10% of a given value.

Thermal resistances, or $R_{ct}$ (defined herein as the temperature difference between the two faces of material divided by the resultant heat flux per unit area in the direction of the gradient, per the International Standard set forth in ISO 11092-2014), was tested for textiles that varied in the number of courses included in the set of intermediary knit courses 120, and as indicated above, a stitch that is held for (X) number of courses forms a set of intermediary courses having a quantity of (X+1). For example, a stitch that is held for 16 courses creates a set of 17 intermediary knit courses (i.e., the initial course of the held stitch combined with the quantity of courses over which the stitch is held). The below table represents a summary of those tests, which were carried out pursuant to the International Standard set forth under ISO 11092-2014.

| Number of courses in the set of Intermediary Courses (i.e., reference numeral 120 in FIG. 1A) | Thermal Resistance ($R_{ct}$) (expressed in square meters kelvin per watt) |
| --- | --- |
| 11 (10-course held stitch) | 44 |
| 15 (14-course held stitch) | 59 |
| 17 (16-course held stitch) | 69 |

In accordance with one aspect of this disclosure, thermal resistance or a thermal-resistance property includes that property as determined and tested according to ISO11092-2014. In view of the table above, it is contemplated that the knit textile 10 of FIGS. 1-1A may have a thermal resistance of at least about 40 $R_{ct}$ (e.g., about 44 $R_{ct}$) when tested under this standard, for example, and the thermal resistance may be increased to at least about 69 $R_{ct}$ as indicated by modifying the knit structure. Thermal resistances well outside this range are also contemplated and may be achieved by modifying the number of intermediary courses in one or more corrugated structures. For example, it is contemplated that the knit textile 10 may have a thermal resistance of between about 20 $R_{ct}$ and about 90 $R_{ct}$, such as between about 35 $R_{ct}$ and about 80 $R_{ct}$ in certain exemplary embodiments. In other aspects, thermal resistance or a thermal-resistance property may be determined or tested according to any other testing standard reasonably accepted by an ordinary skilled artisan.

In an aspect of the present disclosure, the held stitches of zone B are three or fewer courses shorter than the held stitches of zone A, and the held stitches of zone C are three or fewer course shorter than the held stitches of zone B. In other words, if the held stitches of zone A are held for 16 courses, then the held stitches of zone B are held for at least 13, 14, or 15 courses. Likewise, if the held stitches of zone B are held for 15 courses, then the held stitches of zone C are held for 12 courses, 13 courses, or 14 courses. In a further aspect, the held stitches of zone A are held for one course longer than the held stitches in zone B, which are held for one course longer than zone C. For example, if the held stitches of zone A are held for 16 courses, then the held stitches of zone B are held for 15 courses, and the held stitches of zone C are held for 14 courses. As such, the knit textile 210 includes a gradient change in the size of ridges, which in turn provides a relatively gradual change in thermal resistance from one zone to another. A gradual change in thermal resistance across zones of a textile may track with heat-loss maps that sometime show gradient changes from one anatomical region to another. In addition, a gradual change provides a tolerance to account for variability among wearers.

Thermal resistance is one property that may be taken into account when selecting a quantity of courses to be included in the set of intermediary knit courses 120. In addition, the quantity may be selected based on a variety of other factors, including aesthetics, air permeability, fabric weight, wicking properties, dry time, thermal efficiency, snag susceptibility of the face, snag susceptibility of the back, and the like.

Figure 3:
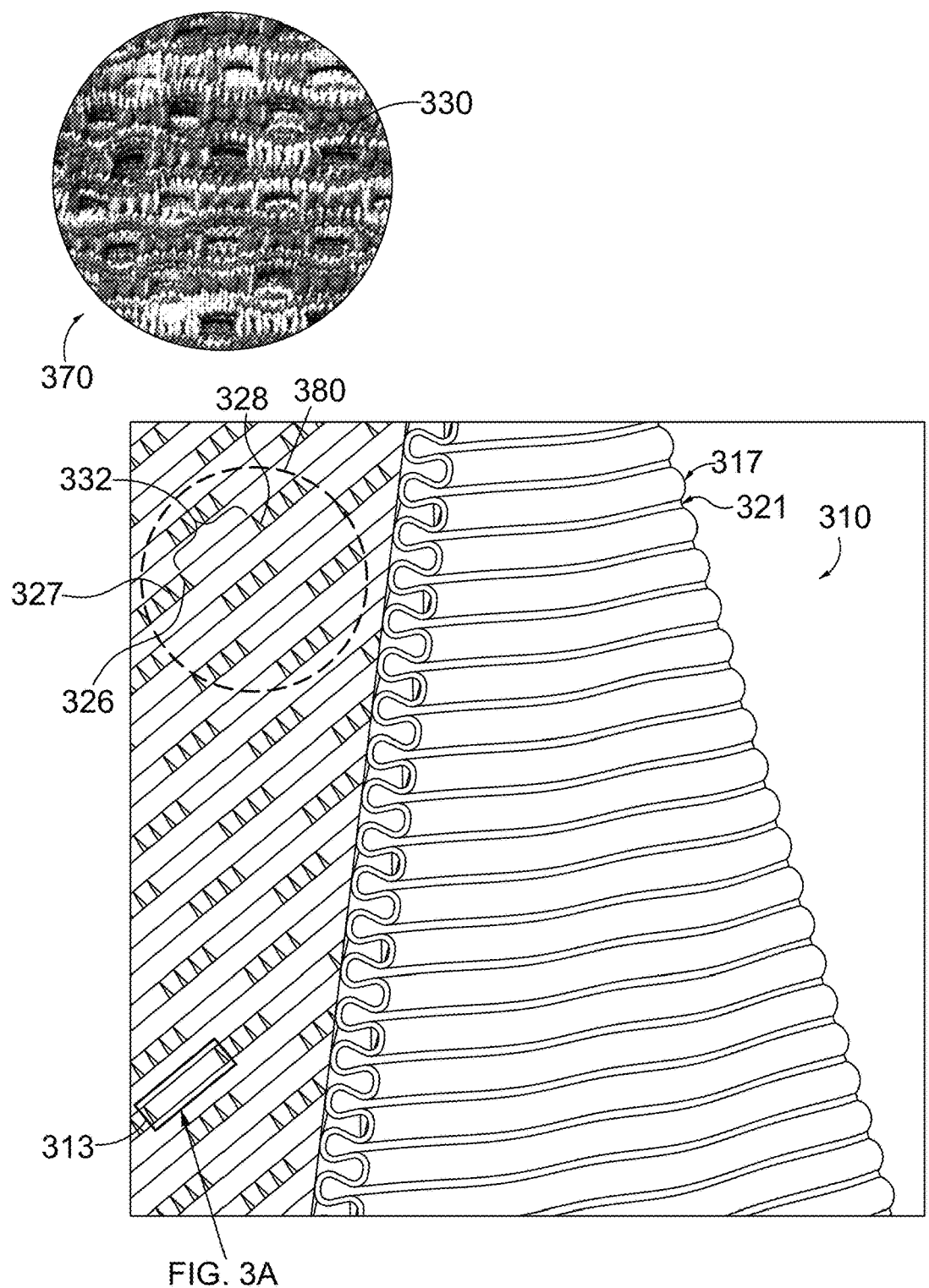
FIG. 3 depicts a knit front side and knit back side of another textile having thermal properties in accordance with an aspect hereof.
Figure 3A:
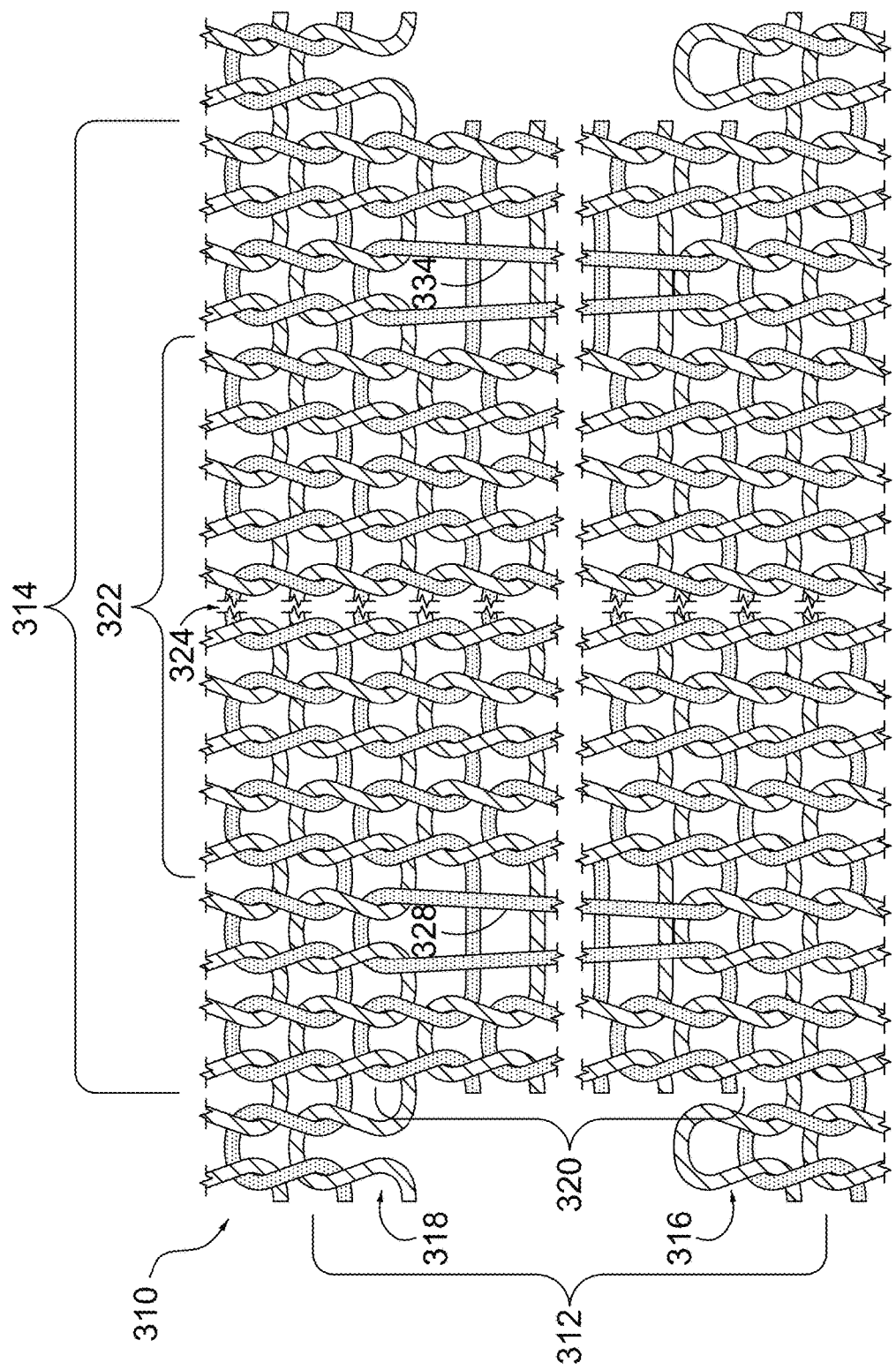
FIG. 3A depicts a schematic of an example knit diagram of a knit structure incorporated into the textile of FIG. 3 in accordance with an aspect hereof.

Reference is now made to FIG. 3, which illustrates another example variation in knit structure that may contribute to thermal-property variability across a textile panel. FIG. 3 depicts a knit textile 310, and for illustrative purposes, a schematic view of a portion 313 of the knit textile 310 is provided in FIG. 3A. A knit structure 311 depicted by FIG. 3A is similar in some respects to the knit structure 110 of FIG. 1A, and the knit structure 311 that is included at least partially throughout the knit textile 310 creates a set of ridges 317 and grooves 321 on a knit back side of the knit textile 310. For example, the knit structure 311 also includes a set of consecutively arranged knit courses 312 and a set of consecutively arranged wales 314 with knit stitches forming a single jersey knit structure. In addition, the set of consecutively arranged knit courses 312 includes a first knit course 316, a second knit course 318, and a set of intermediary knit courses 320 positioned between the first knit course 316 and the second knit course 318.

The schematic of FIG. 3A differs from FIG. 1A in some respects. For example, some held stitches 328 and 334 positioned in a ridge-forming band of courses are spaced apart by a larger quantity of knit stitches than in FIG. 1A. That is, all of the wales between the held stitches 328 and 334 (i.e., the set of wales 322) include knit stitches (or floats in some examples that are not depicted), and held stitches are not positioned among the set of wales 322. In contrast, in FIG. 1A, the held stitches are only spaced apart by a single knit stitch or wale of knit stitches.

In an aspect of the present disclosure, when held stitches are spaced apart by more than a single wale (i.e., spaced apart more than those held stitches 128 and 130 of FIG. 1A) the held stitches may still provide sufficient tension to pull the first knit course 316 towards the second knit course 318, such that the set of wales 322 still extend toward the knit back side and form a ridge 317. In addition, the absence of held stitches among the set of wales 322 provides better visibility to the knit front side of the ridge 317, which has the appearance of cavities or craters when viewed from the knit front side of the knit textile 310. That is, the knit stitches in the set of wales 322 have the appearance of a recess, cavity, or crater that is recessed into the knit textile relative to the held stitches 328 and 334 on either side of the set of wales 322.

FIG. 3 includes a magnified photographic view 370 of a region 380 of the knit front side of the knit textile 310, and the magnified photographic view 370 of FIG. 3 may be visually compared to the magnified photographic view 70 of FIG. 1 to observe differences. For example, in FIG. 3 held stitches 326 and 327 are spaced apart similarly to the held stitches of the knit textile 10 of FIG. 1, and held stitches 326 and 328 are spaced apart by a larger number of knit stitches. When held stitches are positioned at least at every other wale, the held stitches obscure some visibility to a knit front side of the ridges 317 (i.e., the concave surface of the ridge is obscured from view). However, when held stitches are spaced further apart within a ridge-forming band of courses, the absence of held stitches provides better visibility to the knit front side of the ridge 317, which has the appearance of cavities or craters when viewed from the knit front side of the knit textile 310. An example depiction of these regions, which have the appearance of cavities, is identified by reference numeral 330 in FIG. 3. Stated another way, in FIG. 3, the knit structure 332 is included in the ridge-forming band of courses and is arranged between the held stitches 326 and 328 and creates a crater-like structure (e.g., 330 depicted in the magnified photographic view 370). The knit structure 332 includes knit stitches, or a combination of knit stitches and floats. For example, floats may be used move a back yarn to the front (and vice versa).

Turning back to FIG. 3A, a wale 324 is depicted with break lines to illustrate that the set of wales 322 could include various quantities of wales. For example, in FIG. 3A the set of wales 322 includes five wales. In other aspects, the set of wales 322 may include as few as about two wales, which may still provide the appearance of a recessed cavity, as described above, or the set of wales 322 may include more than about five wales. For example, in some aspects, the set of wales 322 may include a quantity of wales between about five and twenty wales. These are merely example ranges and in other aspects, the set of wales 322 may include about twenty or more wales.

As stated previously with respect to FIG. 1, the held stitches in the knit textile 10 are regularly positioned at every other wale, with a single knit stitch generally separating adjacent held stitches. In contrast, in FIG. 3, some of the adjacent held stitches are spaced further apart by a longer series of knit stitches. As such, the knit textile 10 of FIG. 1 could be described as having a higher density of held stitches per a given quantity of wales, as compared with the knit textile 310 of FIG. 3. Other variations could also result in varied held-stitch density. For example, cavities may be similarly sized in different regions (i.e., same number of wales between held stitches), but the cavities may be spaced closer together in one region, which would result in a lower held-stitch density. The lower density of held stitches per a given quantity of wales may contribute to the knit textile 310 of FIG. 3 potentially providing relatively lower thermal resistance.

Thermal resistance was tested for textiles that included a same number of courses in the set of intermediary knit courses (i.e., the held stitches were held for 16 courses) and that varied in the density of held stitches per a given quantity of wales within the ridge-forming band of courses. The below table represents a summary of those tests, which were carried out pursuant to the International Standard set forth under ISO 11092-2014.

| Average Density of 16-course Held Stitches Per Given Quantity of Wales | Thermal Resistance ($R_{ct}$) (expressed in square meters kelvin per watt) |
| --- | --- |
| Approx. 1:2 | 69 |
| Approx. 1:2.25 | 65 |
| Approx. 1:4 | 56 |

In view of the table above, it is contemplated that the knit textile 310 of FIGS. 3-3A may have a thermal resistance of at least about 50 $R_{ct}$ (e.g., such as about 56 $R_{ct}$) when tested under this standard, for example, and the thermal resistance may be increased to at least about 69 $R_{ct}$ as indicated. Thermal resistances well outside this range are also contemplated and may be achieved by modifying the density of held stitches per a given quantity of wales within the ridges of one or more corrugated structures. For example, it is contemplated that the knit textile 310 may have a thermal resistance of between about 40 $R_{ct}$ and about 90 $R_{ct}$, such as between about 50 $R_{ct}$ and about 80 $R_{ct}$ in certain exemplary embodiments.

In an aspect of the present disclosure, a knit textile includes a plurality of zones that gradually change from one held-stitch density to a different held-stitch density. When comparing one zone to another zone, the quantity of wales in each zone is typically consistent. However, that consistent quantity may vary in different aspects. For example, in one aspect, the quantity of wales in each zone is at least 40. In a further aspect, the quantity is in a range of about 40 to about 100. However, these are merely example quantities, and in other aspects, the consistent quantity may be below 40 or above 100.

In an example aspect, a first zone may include a series of ridge-forming bands of courses, in which the held stitches are positioned at least every other wale, such that the average density of held stitches to wales is equal to or greater than 1:2 (e.g., at least 25 held stitches among 50 wales). Furthermore, a second zone may include another series of ridge-forming bands of courses, in which some held stitches are spaced apart by more than one wale, such that the average density of held stitches to wales is less than 1:2 and greater than 1:3.5 (e.g., less than 25 held stitches and more than 14 held stitches among 50 wales). Moreover, a third zone may include another series of ridge-forming bands of courses, in which some held stitches are spaced apart by more wales than in the second zone, such that the average density of held stitches to wales is less than 1:3.5 and greater than 1:8 (e.g., less than 14 held stitches and more than 6 held stitches among 50 wales).

In an aspect of the disclosure, the second zone is arranged between the first and third zones in the knit textile, such that the knit textile includes a gradient change in the density of held stitches from a higher density to a lower density, which in turn provides a relatively gradual change in thermal resistance from one zone to another. As used in this disclosure, the term "between" may describe a relationship in the course direction or in the wale direction. For example, the first zone, second zone, and third zone may each be positioned in a respective set of courses that are different from one another. In another example, zone A, zone B, and zone C may be arranged in a same set of courses (or in courses that overlap with one another), and may be arranged in different wales among that same set of courses.

The description of FIGS. 1, 1A, 2, 3, and 3A describe various elements that may play a role in an amount of thermal resistance of a textile, as well as a textile having varied thermal resistance in different zones. The thermal resistance may be varied by one or more other elements in a knit textile. For example, in one aspect the number of courses in the groove-forming bands of courses may be increased to lower the thermal resistance. In other aspects, the selection of yarn type and yarn size may play a factor in the thermal resistance, as well as finishing processes. For example, a yarn type may be selected to reduce snagging and/or to influence a dyeing process used to dye the textile or a garment made therefrom. For instance, in example aspects, to reduce snagging the textile may be knit using polyester yarns, a combination of polyester and nylon yarns, and/or cationic-dyeable polyester yarns. With respect to dyeing, in example aspects, the polyester yarn may comprise a dope-dyed polyester yarn. The term "dope dyed" as used herein is the process of adding color to a polymer solution before it is extruded through a spinneret. Because it is added to the fibers/filaments as they are being formed, the color pigments are part of the fiber/filament which makes the fibers/filaments generally colorfast. When the textile is formed from a dope-dyed polyester, it is contemplated herein that additional dyeing steps may not be needed. When the textile is formed from a combination of nylon and polyester yarns or is formed from cationic dyeable polyester yarns, the textile, or garments formed from the textile, may be piece dyed (i.e., the textile or garment is dyed after being knitted). Because nylon and polyester yarns take up dye substances differently, it is contemplated herein that a textile or garment comprising both nylon yarns and polyester yarns may have a heather effect after dyeing (e.g., an effect where flecks of alternate colors are present).

In a further aspect of the disclosure, one or more knit textile panels having one or more of the elements described in FIGS. 1, 1A, 2, 3, and 3A is included in an article, such as a garment. The features, including the variable held-stitch length and/or variable held-stitch density, may be positioned throughout the garment based on various considerations, such as a heat-loss map that suggests regions of the body that may give off more heat than others. Other considerations may include a cost to manufacture as a function of time and materials, aesthetics, air permeability, fabric weight, wicking properties, dry time, thermal efficiency, snag susceptibility of the face, snag susceptibility of the back, and the like.

Figure 4:
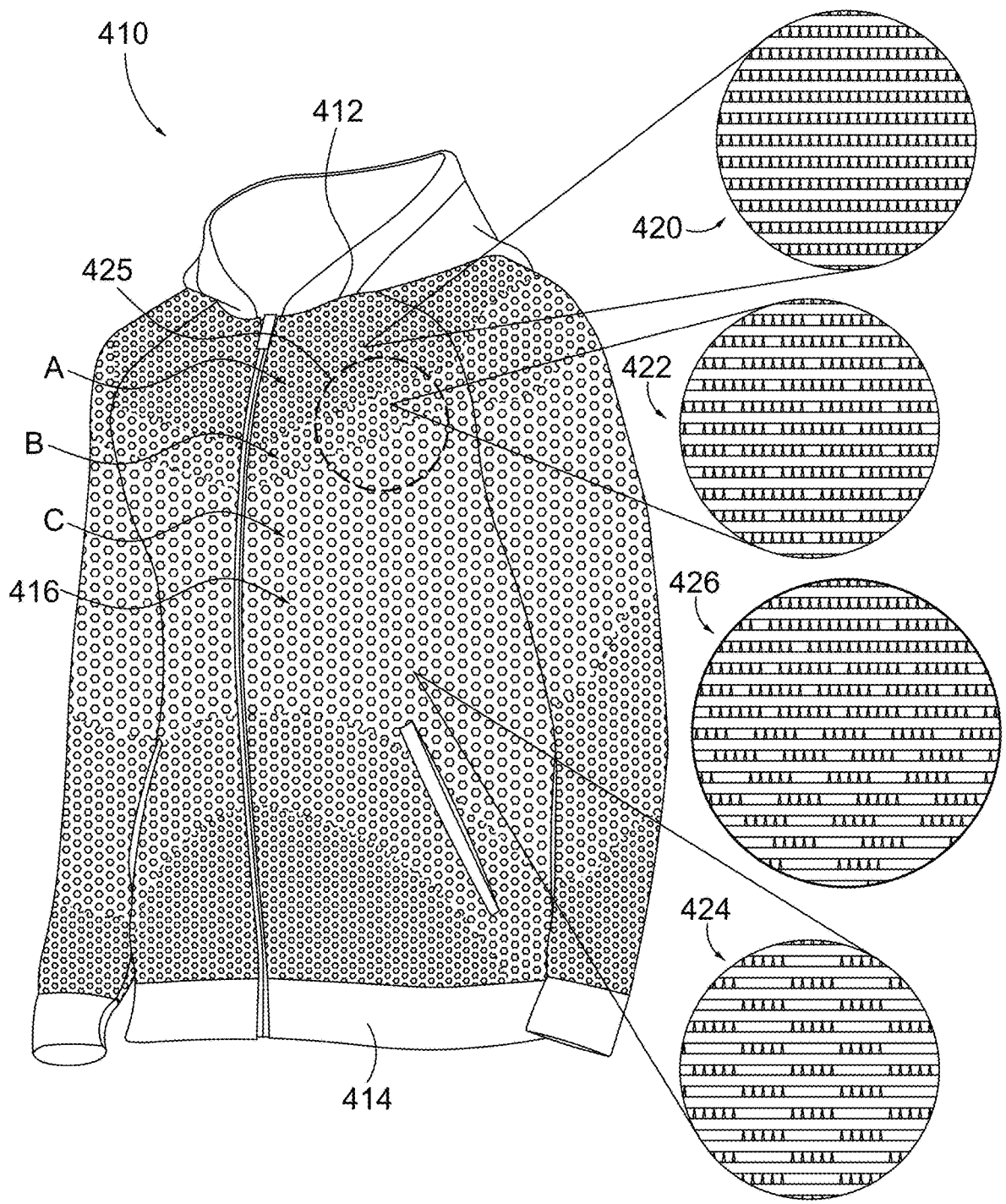
FIG. 4 depicts a front of an upper body garment having thermal properties in accordance with an aspect hereof.

With reference to FIG. 4, an example upper body garment 410 is depicted having a neck collar 412 and a bottom 414 (e.g., bottom margin). As used in this disclosure, a neck collar includes a length of material that circumscribes, and provides a perimeter at least partially around, a neck opening. As such, the upper body garment 410 in FIG. 4 is merely illustrative, and an upper body garment could include a variety of other types of garments, including hooded garments, non-hooded garments, collarless shirts, collared shirts, jackets, base layers, bras, singlets, jumpers, body suits, and the like, all of which include a neck collar. The upper body garment 410 also includes a front panel 416 with a plurality of zones positioned between the neck collar 412 and the bottom 414. In accordance with an aspect of the disclosure, the zones of the upper body garment 410 include at least zone A, zone B, and zone C. Zone B is positioned between zone A and zone C, and zone A is positioned closer to the neck collar 412, whereas zone C is positioned closer to the bottom 414. In a further aspect of the disclosure, the front panel 416 includes a knit textile in which the zones A, B, and C are integrally knit with one another in a seamless manner.

FIG. 4 also depicts magnified views 420, 422, and 424 of the front knit side of each of the zones A, B, and C, and each magnified view depicts a respective pattern of held stitches. Another magnified view 426 includes a combination of all three zones, which is identified as area 425 on the front of the garment. As illustrated, in zone B some of the held stitches are spaced further apart than in zone A, and in zone C some of the held stitches are spaced further apart than in zone B. As such, the magnified views 420, 422, and 424 visually illustrate a gradual transition in held-stitch spacing from zone A to zone C, which may translate to a gradual transition in thermal resistance from a higher thermal-resistance quantity to a lower thermal-resistance quantity. As previously indicated, zone A, second zone B, and zone C may each be positioned in a respective set of courses that are different from one another. In addition, as illustrated by the magnified view 426, zone A, zone B, and zone C may be arranged in a same set of courses (or in courses that overlap with one another), and may be arranged in different wales among that same set of courses. In this respect, the gradual transition in thermal resistance properties may occur from top to bottom, from side to side, or from a combination of top to bottom and side to side.

In FIG. 4, the positioning of zone A may be based at least partially on a heat-loss map, so that when the garment 410 is in an as-worn configuration, zone A aligns with regions of a wearer's body that emit relatively higher amounts of body heat (as compared with other regions of the body). Likewise, the relative positions of zones B and C may be such that when the garment 410 is in an as-worn configuration, zones B and C align with regions of a wearer's body that emit lower amounts of body heat. In one aspect, arranging the knit structure in this manner balances performance optimization with costs associated with increased knitting time and more material by positioning knit structures yielding higher thermal resistance based on a body heat map. In this respect, a garment may be engineered to provide a warmer textile at locations needed by the body and a thinner textile at locations where heat loss is minimal.

Although not illustrated in FIG. 4, zones A, B, and C may vary in other respects as well. For example, in one aspect, zone A may include longer held stitches than zone B, and zone B may include longer held stitches than zone C. As such, zone B may include held stitches that are shorter than held stitches in zone A and that are spaced further apart in some positions, and zone C may include held stitches that are shorter than held stitches in both zones A and B and that are spaced further apart in some positions than both zones A and B. In an alternative aspect, zones A, B, and C may include similar held stitch densities, but the held stitches in zone A may be longer than in zone B, and in zone B the held stitches may be longer than in zone C.

Zonal placement of held stitches may be applied to other areas of an upper torso garment, such as the back of a garment, the sleeves of a garment, and the hood of a garment, and the selection of held-stitch size and density may be based on whether increased or decreased thermal properties are desired in a particular region of the garment. In addition, the zones illustrated in FIG. 4 are merely examples and in other aspects the zones may be divided up in a different manner with different boundaries.

Figure 5:
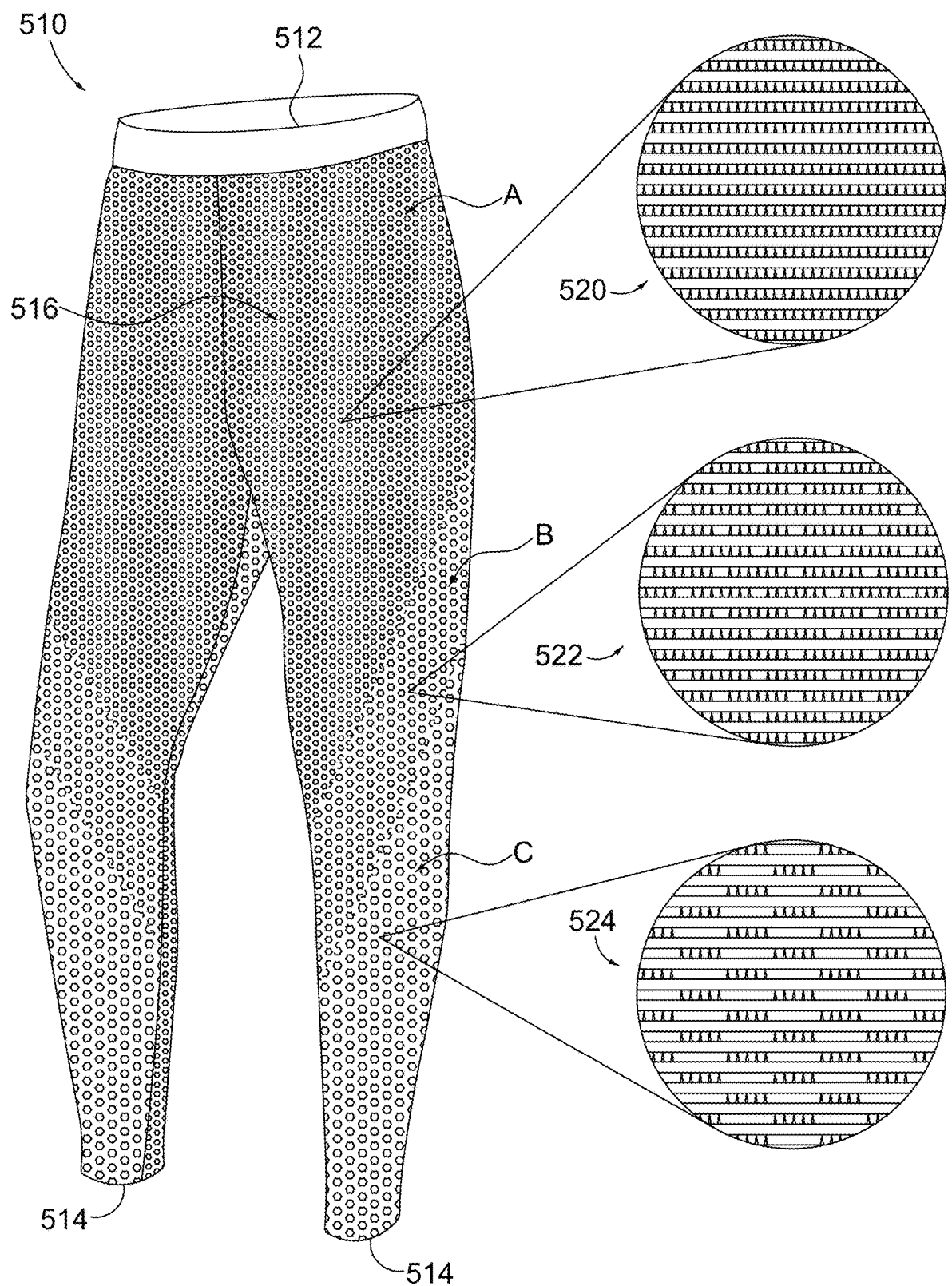
FIG. 5 depicts a front of a lower body garment having thermal properties in accordance with an aspect hereof.

Referring now to FIG. 5, an example lower body garment 510 is depicted having a waistband 512 and leg openings 514. As used in this disclosure, a "waistband" refers to an area of a garment that circumscribes, and forms a perimeter at least partially around, a waist opening of the lower body garment. Furthermore, the lower body garment 510 includes a front panel 516 with a plurality of zones positioned between the waistband 512 and the leg openings 514. In accordance with an aspect of the disclosure, the zones of the lower body garment 510 include zone A, zone B, and zone C. Zone B is positioned between zone A and zone C, and zone A is positioned closer to the waistband 512, whereas zone C is positioned closer to the leg openings 514. In a further aspect of the disclosure, the front panel 516 includes a knit textile in which the zones A, B, and C are integrally knit with one another in a seamless manner.

FIG. 5 also depicts magnified views 520, 522, and 524 of the front knit side of each of the zones A, B, and C, and each magnified view depicts a respective pattern of held stitches. As illustrated, in zone B some of the held stitches are spaced further apart than in zone A, and in zone C some of the held stitches are spaced further apart than in zone B. As such, the magnified views 520, 522, and 524 visually illustrate a gradual transition in held-stitch spacing from zone A to zone C, which may translate to a gradual transition in thermal resistance from a higher thermal-resistance quantity to a lower thermal-resistance quantity. As described with respect to FIG. 4, the gradual transition in thermal resistance properties may occur from top to bottom, from side to side, or from a combination of top to bottom and side to side.

In FIG. 5, the positioning of zone A may be based on a body heat map, so that when the garment 510 is in an as-worn configuration, zone A aligns with regions of a wearer's body that emit relatively higher amounts of body heat (as compared with other regions of the body). Likewise, the relative positions of zones B and C may be such that when the garment 510 is in an as-worn configuration, zones B and C align with regions of a wearer's body that emit lower amounts of body heat. In one aspect, arranging the knit structure in this manner balances performance optimization with costs associated with increased knitting time and more material by positioning knit structures yielding higher thermal resistance based on a body heat map.

Although not illustrated in FIG. 5, zones A, B, and C may vary in other respects as well. For example, in one aspect zone A may include longer held stitches than zone B, and zone B may include longer held stitches than zone C. As such, zone B may include held stitches that are shorter than held stitches in zone A and that are spaced further apart in some positions, and zone C may include held stitches that are shorter than held stitches in both zones A and B and that are spaced further apart in some positions than both zones A and B. In an alternative aspect, zones A, B, and C may include similar held stitch densities, but the held stitches in zone A may be longer than in zone B, and in zone B the held stitches may be longer than in zone C.

Zonal placement of held stitches may be applied to other areas of a lower torso garment, such as the back of a garment and the leg portions of a garment. Likewise, zonal placement of held stitches may be applied to other types of lower body garments, including socks, shorts, tights, briefs, boy shorts, as well as other types of garments, including hats, gloves, shoes, outwear, base layers, and the like. As previously indicated, the selection of held-stitch size and density may be based on whether increased or decreased thermal properties are desired in a particular region of the garment. In addition, the zones illustrated in FIG. 5 are merely examples and in other aspects the zones may be divided up in a different manner with different boundaries.

Aspects herein contemplate performing one or more finishing steps to, for instance, the garment 410 and/or the garment 510. For example, to make the garments 410 and 510 resistant to water penetration such that they are suitable for outdoor wear, the garments 410 and 510 may be treated with a durable water repellant (DWR). This may be particularly useful considering the presence of the cavity-like structures (e.g., 330) on the garments 410 and 510 which may act as an ingress point for precipitation. In one example aspect, the DWR may be applied to the garments 410 and 510 using a vapor deposition process where the garment (or textile) is positioned within a vacuum chamber, and the DWR is super-heated to a plasma state to produce extremely small particles. The vacuum causes the DWR particles to disperse and penetrate the garment. Because of the small particle size, greater penetration of the DWR in the garment may occur including penetration into the cavity-like structures.

A textile having one or more of the elements described with respect to FIGS. 1-5 may be constructed using various techniques. For example, textile panels may be circularly knit into a knit blank, from which the knit textile panels are cut and fashioned together into a garment. Each panel may include zones having varied thermal-resistance properties based on the ridge size within each zone, as well as the location, frequency, and size of cavity-like structures (e.g., 330). In one aspect, panels are arranged within a circularly knit blank to minimize material and time in high-wastage areas. For example, a panel that is engineered with smaller ridges for lower thermal-resistance and for greater cooling might be positioned in the same courses as those that will be waste when the pattern is cut from the circularly knit blank.

Having described various aspects of the subject matter, additional disclosure is provided below. In describing this additional subject matter, reference may be made to the previously described figures.

In one aspect, the subject matter of this disclosure includes a textile comprising a first set of consecutively arranged knit courses including a first knit course, a second knit course, and a first set of intermediary knit courses positioned between the first knit course and the second knit course. The first set of consecutively arranged knit courses includes a first set of held stitches, wherein each held stitch of the first set of held stitches includes stitch legs interlooped with a stitch in the first knit course and a stitch head interlooped with a knit stitch in the second knit course. Furthermore, the first set of intermediary knit courses includes a first quantity of knit courses. The textile also includes a second set of consecutively arranged knit courses including a third knit course, a fourth knit course, and a second set of intermediary knit courses positioned between the third knit course and the fourth knit course. The second set of consecutively arranged knit courses includes a second set of held stitches, and each held stitch of the second set of held stitches includes stitch legs interlooped with a stitch in the third knit course and a stitch head interlooped with a stitch in the fourth knit course. The first knit course and the fourth knit course are connected to one another by one or more knit courses, and the second set of intermediary knit courses includes a second quantity of knit courses that is less than the first quantity of knit courses. For example, in FIG. 2 a ridge-forming band of courses of zone A is connected to a ridge-forming band of courses of zone B, and the held stitches of zone B are shorter than the held stitches of zone A (i.e., held for a fewer number of courses).

In another aspect, the subject matter of this disclosure includes a textile comprising a first set of consecutively arranged knit courses including a first knit course, a second knit course, and a first set of intermediary knit courses positioned between the first knit course and the second knit course. The first set of consecutively arranged knit courses includes a first set of consecutively arranged wales including a first wale, a second wale, and a first set of intermediary wales positioned between the first wale and the second wale, the first set of consecutively arranged wales including a first quantity of wales. The first set of consecutively arranged knit courses also includes a first set of held stitches located between the first wale and the second wale, each held stitch of the first set of held stitches including stitch legs interlooped with a stitch in the first knit course and a stitch head interlooped with a knit stitch in the second knit course, the first set of held stitches including a first quantity of held stitches. The textile also includes a second set of consecutively arranged knit courses including a third knit course, a fourth knit course, and a second set of intermediary knit courses positioned between the third knit course and the fourth knit course. The second set of consecutively arranged knit courses comprises a second set of consecutively arranged wales including a third wale, a fourth wale, and a second set of intermediary wales positioned between the third wale and the fourth wale, the second set of consecutively arranged wales including a second quantity of wales. The second set of consecutively arranged knit courses also includes a second set of held stitches located between the third wale and the fourth wale, each held stitch of the second set of held stitches including stitch legs interlooped with a stitch in the third knit course and a stitch head interlooped with a knit stitch in the fourth knit course, the second set of held stitches including a second quantity of held stitches. Pursuant to an aspect of the disclosure, the first knit course and the fourth knit course are connected to one another by one or more knit courses, and a first ratio of the first quantity of held stitches to the first quantity of wales is larger than a second ratio of the second quantity of held stitches to the second quantity of wales. For example, in FIG. 4 the knit textile in zone A includes a larger ratio of held stitches to wales than the knit textile in zone B, and the knit textiles in these zones are integrally knit.

A further aspect of the disclosure is illustratively depicted by FIG. 2 and includes a textile comprising a first set of consecutively arranged knit courses (e.g., a ridge-forming band of courses in zone A) including a first knit course, a second knit course, and a first set of intermediary knit courses positioned between the first knit course and the second knit course. The first set of consecutively arranged knit courses includes a first set of held stitches, and each held stitch of the first set of held stitches includes stitch legs interlooped with a stitch in the first knit course and a stitch head interlooped with a knit stitch in the second knit course. The textile also includes a second set of consecutively arranged knit courses (e.g., ridge-forming band of courses in zone B) including a third knit course, a fourth knit course, and a second set of intermediary knit courses positioned between the third knit course and the fourth knit course. The second set of consecutively arranged knit courses includes a second set of held stitches, and each held stitch of the second set of held stitches includes stitch legs interlooped with a stitch in the third knit course and a stitch head interlooped with a stitch in the fourth knit course. The textile also includes a third set of consecutively arranged knit courses (e.g., ridge-forming band of courses in zone C) including a fifth knit course, a sixth knit course, and a third set of intermediary knit courses positioned between the fifth knit course and the sixth knit course. The third set of consecutive knit courses includes a third set of held stitches, and each held stitch of the third set of held stitches includes stitch legs interlooped with a stitch in the fifth knit course and a stitch head interlooped with a stitch in the sixth knit course. Pursuant to this aspect, the second set of consecutively arranged knit courses (e.g., in zone B) is positioned between the first and third sets of consecutively arranged knit courses (e.g., in zones A and C respectively). Furthermore, a quantity of knit courses included in the second set of intermediary knit courses is lower than a quantity of knit courses included in the first set of intermediary knit courses and is higher than a quantity of knit courses included in the third set of intermediary knit courses. In FIG. 2, this difference in the respective quantities of knit courses in the set of intermediary knit courses is illustratively depicted by the different sizes of ridges.

An additional aspect of the disclosure is illustratively depicted by the front knit panel of FIG. 4 and includes a textile comprising a first set of consecutively arranged knit courses (e.g., ridge-forming band of courses in zone A) including a first knit course, a second knit course, and a first set of intermediary knit courses positioned between the first knit course and the second knit course. The first set of consecutively arranged knit courses comprises a first set of consecutively arranged wales including a first wale, a second wale, and a first set of intermediary wales positioned between the first wale and the second wale, the first set of consecutively arranged wales including a first quantity of wales. The first set of consecutively arranged knit courses also includes a first set of held stitches located between the first wale and the second wale, each held stitch of the first set of held stitches including stitch legs interlooped with a stitch in the first knit course and a stitch head interlooped with a stitch in the second knit course. The first set of held stitches includes a first quantity of held stitches. The textile also includes a second set of consecutively arranged knit courses (e.g., ridge-forming band of courses in zone B) including a third knit course, a fourth knit course, and a second set of intermediary knit courses positioned between the third knit course and the fourth knit course. The second set of consecutively arranged knit courses includes a second set of consecutively arranged wales including a third wale, a fourth wale, and a second set of intermediary wales positioned between the third wale and the fourth wale, the second set of consecutively arranged wales including a second quantity of wales. The second set of consecutively arranged knit courses also includes a second set of held stitches located between the third wale and the fourth wale, each held stitch of the second set of held stitches including stitch legs interlooped with a stitch in the third knit course and a stitch head interlooped with a stitch in the fourth knit course, the second set of held stitches including a second quantity of held stitches. The textile also includes a third set of consecutively arranged knit courses (e.g., ridge-forming band of courses in zone C) including a fifth knit course, a sixth knit course, and a third set of intermediary knit courses positioned between the fifth knit course and the sixth knit course. The third set of consecutively arranged knit courses includes a third set of consecutively arranged wales including a fifth wale, a sixth wale, and a third set of intermediary wales positioned between the fifth wale and the sixth wale, the third set of consecutively arranged wales including a third quantity of wales. The third set of consecutively arranged knit courses also includes a third set of held stitches located between the fifth wale and the sixth wale, each held stitch of the third set of held stitches including stitch legs interlooped with a stitch in the fifth knit course and a stitch head interlooped with a stitch in the sixth knit course, the third set of held stitches including a third quantity of held stitches. Pursuant to this aspect, the second set of consecutively arranged knit courses (e.g., in zone B) is positioned between the first and third sets of consecutively arranged knit courses (e.g., in zones A and C respectively). In addition, a first ratio of the first quantity of held stitches to the first quantity of wales is larger than a second ratio of the second quantity of held stitches to the second quantity of wales, the second ratio being larger than a third ratio of the third quantity of held stitches to the third quantity of wales.

Another aspect of the disclosure includes a textile having a first set of consecutively arranged wales and a second set of consecutively arranged wales. The first set of consecutively arranged wales includes a first wale, a second wale, and a first set of intermediary wales positioned between the first wale and the second wale. The first set of consecutively arranged wales includes a first quantity of wales. In addition, a first held stitch is positioned in the first wale and a second held stich is positioned in the second wale. In addition, a second set of consecutively arranged wales includes a third wale, a fourth wale, and a second set of intermediary wales positioned between the third wale and the fourth wale. The second set of consecutively arranged wales includes a second quantity of wales that is larger than the first quantity of wales. Furthermore, a third held stitch is positioned in the third wale and a fourth held stitch is positioned in the fourth wale. For example, in FIG. 3A each held stitch 328 and 334 is positioned in a respective wale, and the set of wales 322 may vary in order to create smaller or larger cavities (e.g., 330 and 332).

The disclosure provided in the following paragraphs is consistent with the claims at the end of this Specification. In describing this additional subject matter, reference may be made to the previously described figures.

In one aspect, the subject matter of this disclosure relates to a knitted component comprising a first knit course, a second knit course, where a first set of intermediary knit courses is positioned between the first knit course and the second knit course, a third knit course, and a fourth knit course, where a second set of intermediary knit courses is positioned between the third knit course and the fourth knit course. The knitted component further includes a first set of held stitches extending from the first knit course to the second knit course to form a first corrugated structure, and a second set of held stitches extending from the third knit course to the fourth knit course to form a second corrugated structure. The first corrugated structure may be greater than the second corrugated structure.

Another general aspect relates to a knitted component with a first corrugated structure and a second corrugated structure. The first corrugated structure includes a first knit course, a second knit course coupled to the first knit course via a first set of held stitches, and a first set of intermediary knit courses between the first knit course and the second knit course. The second corrugated structure includes a third knit course, a fourth knit course coupled to the third knit course via a second set of held stitches, and a second set of intermediary knit courses between the third knit course and the fourth knit course. The first set of intermediary knit courses includes more knit courses than the second set of intermediary knit courses.

Another general aspect relates to a knitted component with a first corrugated structure extending in a course direction and a second corrugated structure adjacent to the first corrugated structure and extending in the course direction. The first corrugated structure includes a first knit course and a second knit course coupled to the first knit course via a first set of held stitches. A first cavity and a second cavity of the first corrugated structure are each located between consecutive held stitches of the first set of held stitches in the course direction. The second corrugated structure includes a third knit course and a fourth knit course coupled to the third knit course via a second set of held stitches. A third cavity of the second corrugated structure is located between consecutive held stitches of the second set of held stitches in the course direction. At least a portion of the third cavity is located between the first cavity and the second cavity in the course direction.

The embodiments listed above may include one or more optional features, including (but not limited to) one or more of the features listed in this paragraph. For example, a knitted component in accordance with one or more of the aspects above may have a first corrugated structure and a second corrugated structure that are formed (e.g., fully formed) with a single jersey knit structure. Additionally or alternatively, a first set of intermediary knit courses may include a first quantity of knit courses, a second set of intermediary knit courses may include a second quantity of knit courses, and the second quantity may be less than the first quantity. The first quantity of knit courses and the second quantity of knit courses may both be in a range of about 5 knit courses to about 25 knit courses. Further, the first quantity of knit courses and the second quantity of knit courses may differ by a third quantity that is equal to or less than 3. For example, the first quantity of knit courses may be in a range of about 13 knit courses to about 19 knit courses, and the second quantity of knit courses may be in a range of about 12 knit courses to about 18 knit courses. When the knitted component includes one or more held stitches, each held stitch may include stitch legs interlooped with a stitch in a first knit course and a stitch head interlooped with a stitch in the second knit course, where the first and second knit courses are separated by intermediary courses. In some embodiments, a portion of the knitted component that includes a first corrugated structure and a second corrugated structure may have a thermal resistance of at least about 40 $R_{ct}$ when tested pursuant to ISO 11092-2014. If the knitted component includes two or more cavities, a first cavity may have more wales than a second cavity.

From the foregoing, it will be seen that this subject matter is one well adapted to attain the ends and objects hereinabove set forth together with other advantages which are inherent to the structure. It will be understood that certain features and subcombinations are of utility and may be employed without reference to other features and subcombinations. This is contemplated by and is within the scope of the claims. Since many possible alternatives might be made without departing from the scope thereof, it is to be understood that all matter herein set forth or shown in the accompanying drawings is to be interpreted as illustrative and not in a limiting sense.

We claim:

1. A knitted component having a knit back side and a knit front side opposite the knit back side, the knitted component comprising:
   a first zone having a first thermal resistance and a first ridge-forming band of knit courses defining a first thickness measured from the knit front side to a first peak of a first ridge that extends from the knit back side and that is formed by the first ridge-forming band of knit courses, the first ridge-forming band of knit courses comprising:
      a first knit course;
      a separate second knit course;
      a first number of intermediary knit courses positioned between the first knit course and the separate second knit course; and
      a first plurality of held stitches held between the first knit course and the separate second knit course and extending over the first number of intermediary knit courses, wherein individual held stitches in the first plurality of held stitches are positioned in every other wale of the first knit course and the separate second knit course, wherein a first tension of the first plurality of held stitches pulls the first knit course toward the separate second knit course, thereby forming a first corrugated structure extending from the knit back side;
   a second zone having a second thermal resistance and a second ridge-forming band of knit courses defining a second thickness measured from the knit front side to a second peak of a second ridge that extends from the knit back side and that is formed by the second ridge-forming band of knit courses, the second ridge-forming band of knit courses comprising:
      a third knit course;
      a separate fourth knit course;
      a second number of intermediary knit courses positioned between the third knit course and the separate fourth knit course; and
      a second plurality of held stitches held between the third knit course and the separate fourth knit course and extending over the second number intermediary knit courses, wherein individual held stitches in the second plurality of held stitches are positioned in every other wale of the third knit course and the separate fourth knit course a second tension of the second plurality of held stitches pulls the third knit course toward the separate fourth knit course, thereby forming a second corrugated structure extending from the knit back side,
   wherein the first number of intermediary knit courses is greater than the second number of intermediary knit courses; and
   a groove-forming band of knit courses comprising two or more consecutively interlooped knit courses located between the first ridge-forming band of knit courses and the second ridge-forming band of knit courses, the groove-forming band of knit courses connecting the separate second knit course of the first ridge-forming band of knit courses with the third knit course of the second ridge-forming band of knit courses, wherein the first thickness of the first zone is greater than the second thickness of the second zone, and wherein based at least in part on the first thickness of the first zone being greater than the second thickness of the second zone, the first thermal resistance of the first zone is greater than the second thermal resistance of the second zone.

2. The knitted component of claim 1, wherein the first corrugated structure and the second corrugated structure are formed with a single jersey knit structure.

3. The knitted component of claim 1, wherein the first number of intermediary knit courses and the second number of intermediary knit courses are both in a range of about 5 knit courses to about 25 knit courses.

4. The knitted component of claim 3, wherein the first number of intermediary knit courses differs from the second number of intermediary knit courses by three or less knit courses, and wherein the first corrugated structure extends from the knit back side to a greater extent than the second corrugated structure.

5. The knitted component of claim 1 wherein the first number of intermediary knit courses is in a range of about 13 intermediary knit courses to about 19 intermediary knit courses, and wherein the second number of intermediary knit courses is in a range of about 12 intermediary knit courses to about 18 intermediary knit courses.

6. The knitted component of claim 1, wherein each held stitch of the first plurality of held stitches includes stitch legs interlooped with a stitch in the first knit course and a stitch head interlooped with a stitch in the separate second knit course.

7. The knitted component of claim 1, wherein the first thermal resistance of the first zone is at least 40 $R_{ct}$ according to ISO 11092-2014.

8. A knitted component having a knit back side and a knit front side opposite to the knit back side, the knitted component comprising:
   a first zone having a first corrugated structure extending from the knit back side defining a first thickness measured from the knit front side to a first peak of a first ridge formed by the first corrugated structure extending from the knit back side, the first corrugated structure comprising:
      a first knit course;
      a separate second knit course coupled to the first knit course via a first set of held stitches; and a first number of intermediary knit courses between the first knit course and the separate second knit course, wherein the first set of held stitches are held between the first knit course and the separate second knit course, wherein individual held stitches in the first set of held stitches are positioned in every other wale of the first knit course and the separate second knit course, and wherein a first tension of the first set of held stitches pulls the first knit course toward the separate second knit course;

a second zone having a second corrugated structure also extending from the knit back side defining a second thickness measured from the knit front side to a second peak of a second ridge formed by the second corrugated structure extending from the knit back side, the second corrugated structure comprising:
  a third knit course;
  a separate fourth knit course coupled to the third knit course via a second set of held stitches; and
  a second number of intermediary knit courses between the third knit course and the separate fourth knit course, wherein the second set of held stitches are held between the third knit course and the separate fourth knit course, wherein individual held stitches in the second set of held stitches are positioned in every other wale of the third knit course and the separate fourth knit course, and wherein a second tension of the second set of held stitches pulls the third knit course toward the separate fourth knit course;

a groove-forming band of knit courses comprising two or more consecutively interloped knit courses connecting the separate second knit course of the first corrugated structure to the third knit course of the second corrugated structure, wherein the first number of intermediary knit courses of the first corrugated structure includes more knit courses than the second number of intermediary knit courses of the second corrugated structure, and wherein the first thickness of the first zone is greater than the second thickness of the second zone, and wherein based at least in part on the first thickness being greater than the second thickness, a first thermal resistance of the first zone is greater than a second thermal resistance of the second zone.

9. The knitted component of claim 8, wherein the first corrugated structure and the second corrugated structure are formed with a single jersey knit structure.

10. The knitted component of claim 8, wherein the first number of intermediary knit courses and the second number of intermediary knit courses are both in a range of about 5 knit courses to about 25 knit courses.

11. The knitted component of claim 10, wherein the first number of intermediary knit courses differs from the second number of intermediary knit courses by three or less knit courses.

12. The knitted component of claim 10, wherein the first number of intermediary knit courses is in a range of about 13 knit courses to about 19 knit courses, and wherein the second number of intermediary knit courses is in a range of about 12 knit courses to about 18 knit courses.

13. The knitted component of claim 8, wherein each held stitch of the first set of held stitches includes stitch legs interlooped with a stitch in the first knit course and a stitch head interlooped with a stitch in the separate second knit course.

14. The knitted component of claim 13, wherein each held stitch of the second set of held stitches includes stitch legs interlooped with a stitch in the third knit course and a stitch head interlooped with a stitch in the separate fourth knit course.

15. The knitted component of claim 8, wherein the first thermal resistance of the first zone is at least 40 $R_{ct}$ according to ISO 11092-2014.

16. A knitted component having a knit back side and a knit front side opposite the knit back side, the knitted component comprising:
  a first zone having a first thermal resistance and a first corrugated structure extending from the knit back side of the knitted component in a course direction defining a first thickness of the first zone measured from the knit front side to a first peak of a first ridge formed by the first corrugated structure extending from the knit back side, the first corrugated structure comprising:
    a first concave surface on the knit front side and a corresponding first convex surface on the knit back side;
    a first knit course; and
    a separate second knit course coupled to the first knit course via a first tension created by a first group of held stitches and a second group of held stitches, wherein the first group of held stitches is spaced apart from the second group of held stitches, wherein individual held stitches within the first group of held stitches are positioned in every other wale of the first knit course and the separate second knit course, and wherein individual held stitches within the second group of held stitches are positioned in every other wale of the first knit course and the separate second knit course, wherein the first corrugated structure comprises a first number of intermediary knit courses between the first knit course and the separate second knit course;
  a second zone having a second thermal resistance and a second corrugated structure also extending from the knit back side in the course direction defining a second thickness of the second zone measured from the knit front side to a second peak of a second ridge formed by the second corrugated structure extending from the knit back side, wherein the first corrugated structure is adjacent and connected to the second corrugated structure via a first groove-forming band comprising a first number of consecutively interloped knit courses, the second corrugated structure comprising:
    a second concave surface on the knit front side and a corresponding second convex surface on the knit back side;
    a third knit course; and
    a separate fourth knit course coupled to the third knit course via a second tension created by a third group of held stitches and a fourth group of held stitches, wherein the third group of held stitches is spaced apart from the fourth group of held stitches, wherein individual held stitches within the third group of held stitches are positioned in every other wale of the third knit course and the separate fourth knit course, and wherein individual held stitches within the fourth group of held stitches are positioned in every other wale of the third knit course and the separate fourth knit course, wherein the second corrugated structure comprises a second number of intermediary knit courses between the third knit course and the separate fourth knit course;

wherein the first number of intermediary knit courses is greater than the second number of intermediary knit courses;

wherein the first group of held stitches and the second group of held stitches obscure the first concave surface of the first corrugated structure on the knit front side, thereby forming a first cavity located on the knit front side and between the first group of held stitches and the second group of held stitches, wherein the first concave surface of the first corrugated structure is visible in the first cavity; and wherein the third group of held stitches and the fourth group of held stitches obscure the second concave surface of the second corrugated structure on the knit front side, thereby forming a second cavity also located on the knit front side and between the third group of held stitches and the fourth group of held stitches of the second corrugated structure, wherein the second concave surface of the second corrugated structure is visible in the second cavity.

17. The knitted component of claim 16, wherein the first corrugated structure and the second corrugated structure are formed with a single jersey knit structure.

18. The knitted component of claim 16, wherein the first thermal resistance of the first zone is at least 40 $R_{ct}$ according to ISO 11092-2014.

19. The knitted component of claim 16, wherein the first number of wales is greater than the second number of wales.

* * * * *